S. MIKE & S. SOLTESZ.
NUT LOCK.
APPLICATION FILED DEC. 30, 1915.
1,210,669.
Patented Jan. 2, 1917.
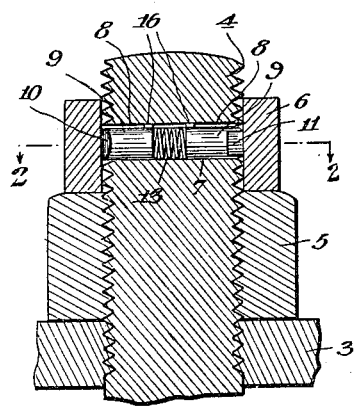
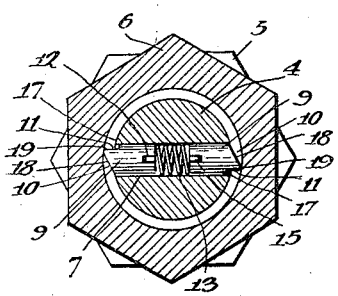
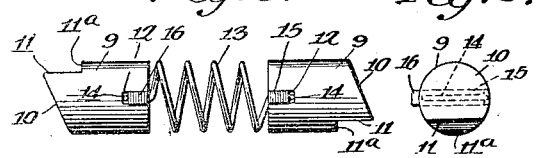 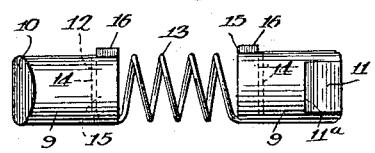
Inventors
Stephen Mike
Samuel Soltesz

UNITED STATES PATENT OFFICE.

STEPHEN MIKE AND SAMUEL SOLTESZ, OF CLEVELAND, OHIO.

NUT-LOCK.

1,210,669.  Specification of Letters Patent.  Patented Jan. 2, 1917.

Application filed December 30, 1915. Serial No. 69,376.

*To all whom it may concern:*

Be it known that we, STEPHEN MIKE and SAMUEL SOLTESZ, both subjects of the King of Hungary, residing at Cleveland, in the county of Cuyahoga and State of Ohio, have invented a new and useful Improvement in Nut-Locks, of which the following is a specification, the principle of the invention being herein explained and the best mode in which we have contemplated applying that principle, so as to distinguish it from other inventions.

Our invention relates to a nut lock and more particularly to a device of this character such that the possibility is afforded of making the parts permanently inseparable barring destruction thereof.

The object of our invention is to provide a structure which will not be unduly expensive, which will be efficient in operation and which will not require any manual operation in addition to the relative movement of the nut upon its bolt.

With the foregoing and other objects in view the invention consists of the novel construction, combination and arrangement of parts as hereinafter more specifically described and illustrated in the accompanying drawings, wherein are shown preferred and modified embodiments of the invention, but it is to be understood that many other changes, variations and modifications can be resorted to which come within the scope of the claim hereunto appended.

Adverting to the drawings:—

Figure I is a section of a structure embodying our invention in association with a bolt and nut. Fig. II is a section on line II—II of Fig. I with one detail appearing in full lines. Figs. III and IV are enlarged plan and side views respectively of the locking detail removed. Fig. V is an end view of Fig. III.

A member 3 to be fastened is provided with an opening through which a bolt is inserted. The bolt is provided with threads 4 with which a plain ordinary nut 5 may first coact to be followed with a lock nut 6 embodying one feature of our invention. It should be understood that the nut 5 is unessential and is merely shown by way of arbitrary preference.

The form of our invention illustrated in Fig. I requires provision of a circular bore 7 extending through the bolt near the extremity of its threaded portion. Such bore is itself additionally fashioned with a narrow channel 8 extending along and in open communication with the bore 7 as appears in Fig. I. Adapted for insertion into the bore 7 is a spring expansible locking pin including symmetrical end portions 9 having parallelly extending oblique end portions 10 and at opposite sides rectilinear cut-out portions to form flat surfaces 11 and angularly related shoulders 11ª. The opposed ends of the portions 9 are fashioned with slots 12 in which the right angled extremities of a compression spring 13 are to be seated. Such extremities 14 of the spring 13 appear in place in Figs. II and III and are so detachably secured by means of plugs 15. The arrangement so far described is such that the spring 13 normally holds the portions 9 separated over an extent in excess of the diameter of the bolt. The portions 9 are each furthermore fashioned with alined projections 16 clearly shown in Fig. III. These are adapted to occupy the channel 8 and thus necessitate an insertion of the expansive pin into the bore 7 such that the oblique end surfaces 10 thereof face in opposition to the direction of rotation of the nut 6 toward the head of the bolt. After the pin has been inserted in the bore 7 the opposite end edges of the latter are formed with burs 17 projecting toward the axis of the bore so as to engage with the shoulders 11ª of the cut-out portions and thereby definitely limit the outward expansion of the portions 9.

The nut 6, in order to coöperate with the expansive pin in the bolt, is fashioned with a pair of diametrically opposed notches 18 having radially extending sides 19. Such sides 19 will define the forward limit of the notches with reference to the direction of movement of the nut toward the head of the bolt.

It should now be apparent that an ordinary nut may be secured upon the bolt such that its threads are caused to engage, slide over and compress the oblique surfaces 10 of the pin without causing any appreciable hindrance against such manipulation. The same is clearly true in the case of the nut 6 constructed after the manner of our invention. If however it is attempted to reverse the nut 6, after the same has completely covered the pin, such nut's interior surface will presently be caused to come into engagement with the flat surfaces 11 and prevent further rotation tending to remove the nut. Inasmuch as the locking surfaces are in a sense interiorly located and inaccessible to any tool in the position in which the parts are seen in Fig. I the lock nut is absolutely permanent unless a destruction of the same is brought about.

We claim:—

A nut lock comprising a bolt, a nut and a member to be fastened, one of said parts being provided with a notch, another being provided with a bore, a compression spring in such bore and having a right angled extremity, a pin provided with a slot adapted to seat such extremity, and a plug for securing the latter in place, said pin being adapted to engage said notch in the manner specified.

Signed by us this 28th day of December, 1915.

STEPHEN MIKE.
SAMUEL SOLTESZ.

Copies of this patent may be obtained for five cents each, by addressing the "Commissioner of Patents, Washington, D. C."